US007614158B2

(12) United States Patent
Uttaro

(10) Patent No.: US 7,614,158 B2
(45) Date of Patent: Nov. 10, 2009

(54) METHODS AND DEVICES FOR DECODING LOCKS

(76) Inventor: Michael Thomas Uttaro, 11247 Caisson Ct., Woodbridge, VA (US) 22192

( * ) Notice: Subject to any disclaimer, the term of this patent is extended or adjusted under 35 U.S.C. 154(b) by 284 days.

(21) Appl. No.: 11/604,372

(22) Filed: Nov. 27, 2006

(65) Prior Publication Data

US 2007/0119065 A1 May 31, 2007

Related U.S. Application Data

(60) Provisional application No. 60/739,977, filed on Nov. 26, 2005.

(51) Int. Cl.
*G01B 1/00* (2006.01)
*E05B 19/20* (2006.01)
*E05B 19/00* (2006.01)

(52) U.S. Cl. .......... 33/540; 70/394; 70/395; 76/110

(58) Field of Classification Search .......... 33/540, 33/539, 562, 563, 566; 70/394, 295, 409, 70/410, 395; 76/110
See application file for complete search history.

(56) References Cited

U.S. PATENT DOCUMENTS 135,600 A 2/1873 Seibert
947,913 A 2/1910 Jenkins
1,707,642 A * 4/1929 Segal .......... 70/406
1,863,525 A 6/1932 Long
1,991,151 A * 2/1935 Hansen .......... 33/540
2,065,294 A * 12/1936 Simon .......... 76/110
2,066,645 A 1/1937 Rial
2,257,054 A * 9/1941 Hoffman .......... 33/540
2,338,768 A 1/1944 Johnstone
2,707,410 A * 5/1955 Falk .......... 76/110
2,763,027 A * 9/1956 Tampke .......... 70/460
2,791,840 A * 5/1957 Harwell .......... 33/540
3,264,908 A 8/1966 Moore
3,827,151 A 8/1974 Naill
3,985,010 A 10/1976 Idoni
3,987,654 A 10/1976 Iaccino et al.
4,006,613 A 2/1977 Zion
4,300,416 A * 11/1981 Ross .......... 81/463
4,535,546 A 8/1985 Smith
4,638,567 A 1/1987 Leversee
4,667,494 A 5/1987 Joosten
4,680,870 A * 7/1987 McConnell .......... 33/540

(Continued)

OTHER PUBLICATIONS

Robinson, R.L., (1973) Professional Locksmithing, Nelson-Hall Publishing, Chicago, Illinois.

*Primary Examiner*—Amy Johnson
(74) *Attorney, Agent, or Firm*—Capitol Patent & Trademark Law Firm, PLLC

(57) ABSTRACT

The decoding of a lock, such as a pin tumbler type of lock, is completed by utilizing a method that includes the insertion of a key blank or other material with one or more reference indicators on a modifiable surface, into a keyway of the lock. The key blank is inserted until a stopping resistance is detected. Such a resistance occurs when a pin of the lock reaches a shear line position. After such a position is reached a marking is made on the key blank and a measurement is made. The measurement is compared to markings on a novel decoding template to determine the depth of a cut that should be made on an uncut key.

13 Claims, 5 Drawing Sheets

U.S. PATENT DOCUMENTS 4,817,406 A * 4/1989 Martin ........................ 70/394
5,172,578 A 12/1992 Bitzios
6,134,928 A * 10/2000 Kang .......................... 70/394
2005/0092048 A1* 5/2005 Mathena ...................... 70/394

* cited by examiner

FIG. 6

| SCHLAGE | | | | .015 |
|---|---|---|---|---|
| Depth of Cut | Code No. | Bottom Pin | Master Pin | Top Pin |
| .335 | 0 | .165 | — | |
| .320 | 1 | .180 | — | |
| .305 | 2 | .195 | .030 | .235* |
| .290 | 3 | .210 | .045 | |
| .275 | 4 | .225 | .060 | |
| .260 | 5 | .240 | .075 | .200 |
| .245 | 6 | .255 | .090 | |
| .230 | 7 | .270 | .105 | |
| .215 | 8 | .285 | .120 | .165 |
| .200 | 9 | .300 | .135 | |
| E.D. = .580 T.F.C. = .231 B.C.C. = .156<br>M.A.C.S. = 7 | | | | |

METHODS AND DEVICES FOR DECODING LOCKS

RELATED APPLICATION

This application claims the benefit of priority of U.S. Provisional Patent Application No. 60/739,977 filed Nov. 26, 2005 the contents of which are incorporated in full herein as if set forth in full herein.

BACKGROUND OF THE INVENTION

Typically, a locksmith will use traditional techniques such as "picking" or "impressioning a lock" in an attempt to open a lock when a key has been lost or becomes unavailable. These techniques, however, can be time-consuming and complex and their success rate is spotty at best. For example, picking requires the use of various tools to roughly simulate the action of a key. It requires lifting or shaking the pins in a lock until it opens. As those skilled in the art recognize, the success of this technique is somewhat left to chance because the locksmith has little or no knowledge of the depth of the pins within the lock. Impressioning is a time consuming and art driven process of creating and then filing impressions/marks that are caused by contact with pins in the lock. It involves applying a great deal of force to create marks on a key blank to indicate the position and depth of the pins in the lock. For example, this technique requires repeated insertion of a blank into a lock, rigorous torquing of the blank up and down when inside the lock to make sure that the pins inside make sufficient impressions on the blank, and then filing the blank until the proper depths and spacing are determined by the impressions left on the blank. Even after the filing is completed, the now impressioned blank may still not open the lock easily because the filing may be too deep, too shallow, have incorrect spacing or a variation of the three. Further, neither picking nor impressioning attempt to decode or "read" the pins in a lock so a locksmith can simply cut a new key using a key cutting code machine.

Accordingly, it is desirable to provide novel methods and devices for decoding a lock that overcome the disadvantages of conventional techniques.

SUMMARY OF THE INVENTION

The present inventor has recognized that the decoding of a lock, such as a pin tumbler, disc tumbler, and/or wafer type of lock, may be completed by utilizing a method that includes the steps of: (a) inserting a device, such as a key blank or other device (i.e., any device that fits into a keyway, such as a thin ruler) that includes one or more reference indicators on a modifiable surface into a keyway of a pin tumbler type of lock until a stopping resistance occurs when a pin of the lock reaches a shear line position; (b) making a marking on the device that corresponds to a point at which the resistance occurred, the marking further representing the general position where a cut may be made on an uncut key; (c) making a measurement from the marking to a reference position on the device; (d) comparing the measurement with pre-determined depth values to determine a current depth for the cut associated with the marking; (e) repeating steps (a) through (d) for each pin of the lock; and (f) making cuts into an uncut key using the determined markings and associated current depths.

BRIEF DESCRIPTION OF THE DRAWINGS

FIG. 5 depicts the pre-loading of a lock to create a decoding template and the like according to another embodiment of the invention while FIG. 6 depicts an example of a manufacturer's reference card used to create a decoding template like that in FIG. 5.

DETAILED DESCRIPTION OF THE INVENTION

Figure 1A:
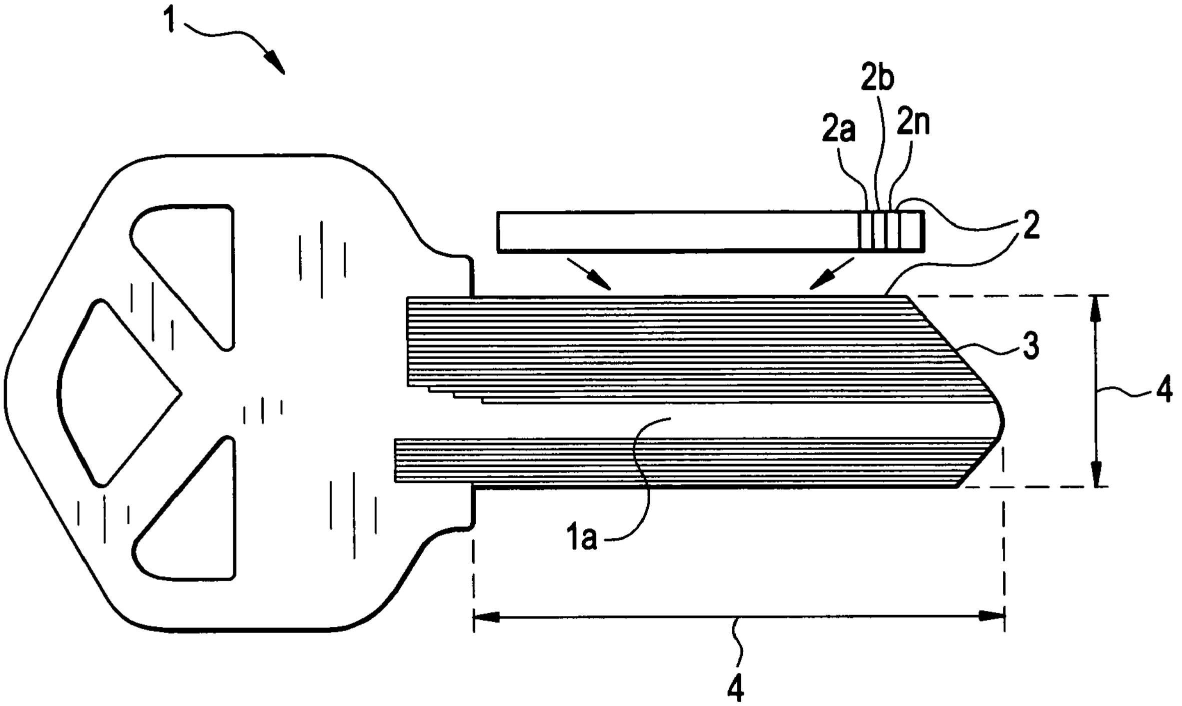
FIGS. 1*a* and 1*b* depict the dimensions of a key blank that may be used to decode a lock according to one embodiment of the present invention.
Figure 1B:
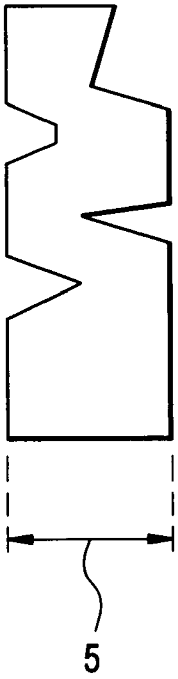

Referring to FIG. 1*a* there is shown a device 1, such as an uncut key blank, with one or more reference indicators 2*a-n* (where "n" is the last indicator) placed on a modifiable surface 1*a* according to one embodiment of the present invention. FIG. 1*a* depicts the markings 2*a*-2*n* in a magnified fashion, it being understood that the markings are a part of an edge 2 or the like of surface 1*a*. The blank 1 may also include the proper grooves 3, dimensions 4 and thicknesses 5 (see FIG. 1*b*) to conform to the profile of a keyway of a lock (not shown in FIG. 1). By "modifiable" is meant that the appearance of the surface 1*a* may be changed by a locksmith or other user of blank 1 by, for example, adding scribe markings as described below. Other words (and, therefore, surfaces), besides "modifiable", that describe a similar type of surface are meant to be included within the scope of the present invention, it being understood that the inclusion of a description of each similar word/surface would greatly lengthen the present discussion and make it unnecessarily harder to understand.

Figure 2:
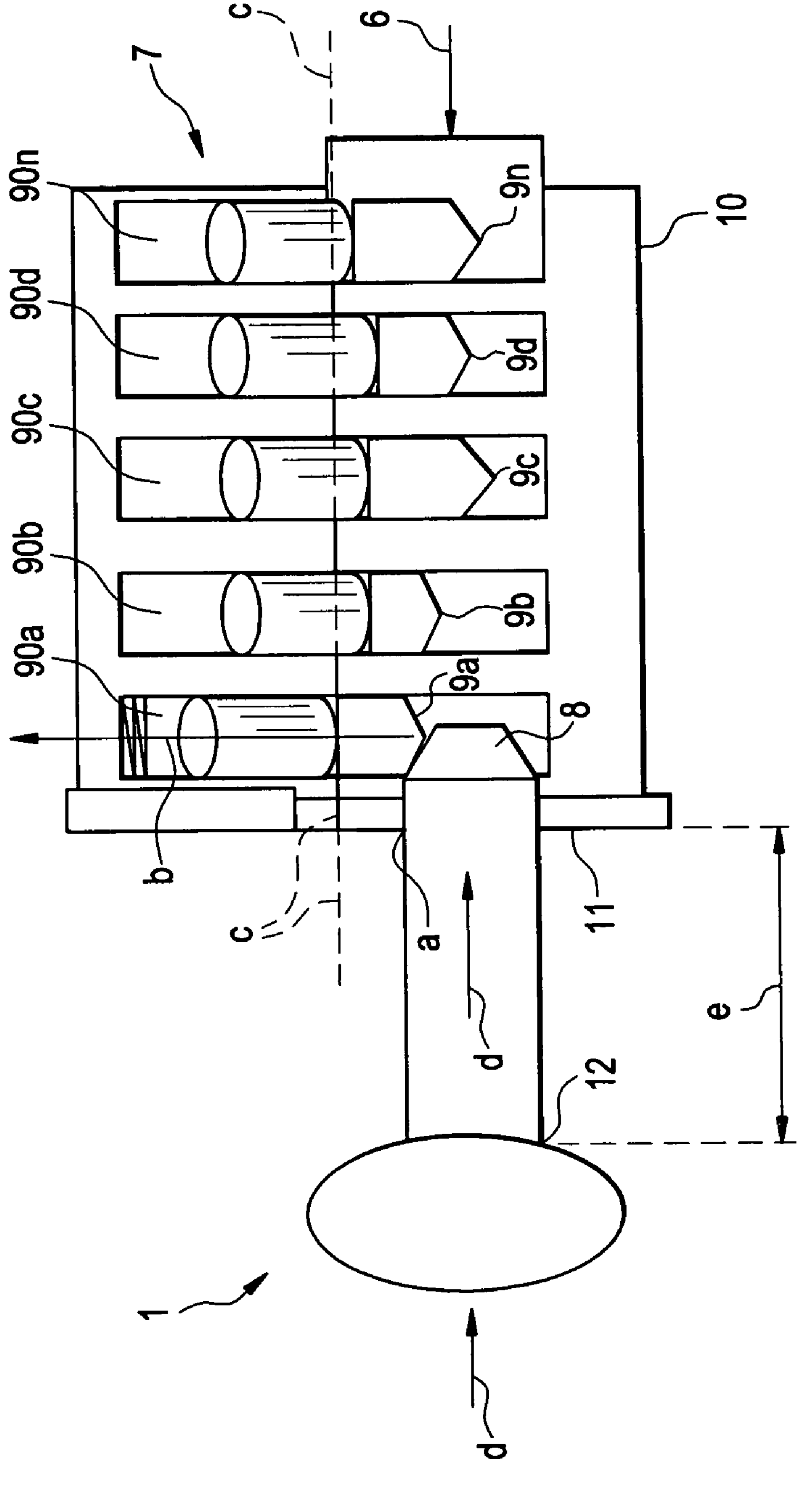
FIG. 2 depicts a method for using a key blank, such as the one shown in FIGS. 1*a* and 1*b*, to decode a lock according to one embodiment of the present invention.

Referring now to FIG. 2, in an exemplary method of the present invention, the blank 1 may be inserted into a keyway 6 of a lock 7, such as a pin tumbler type of lock, until a stopping or stiff resistance occurs (i.e., is felt) indicating a "stop" or "stopping" position "a".

Figure 3:
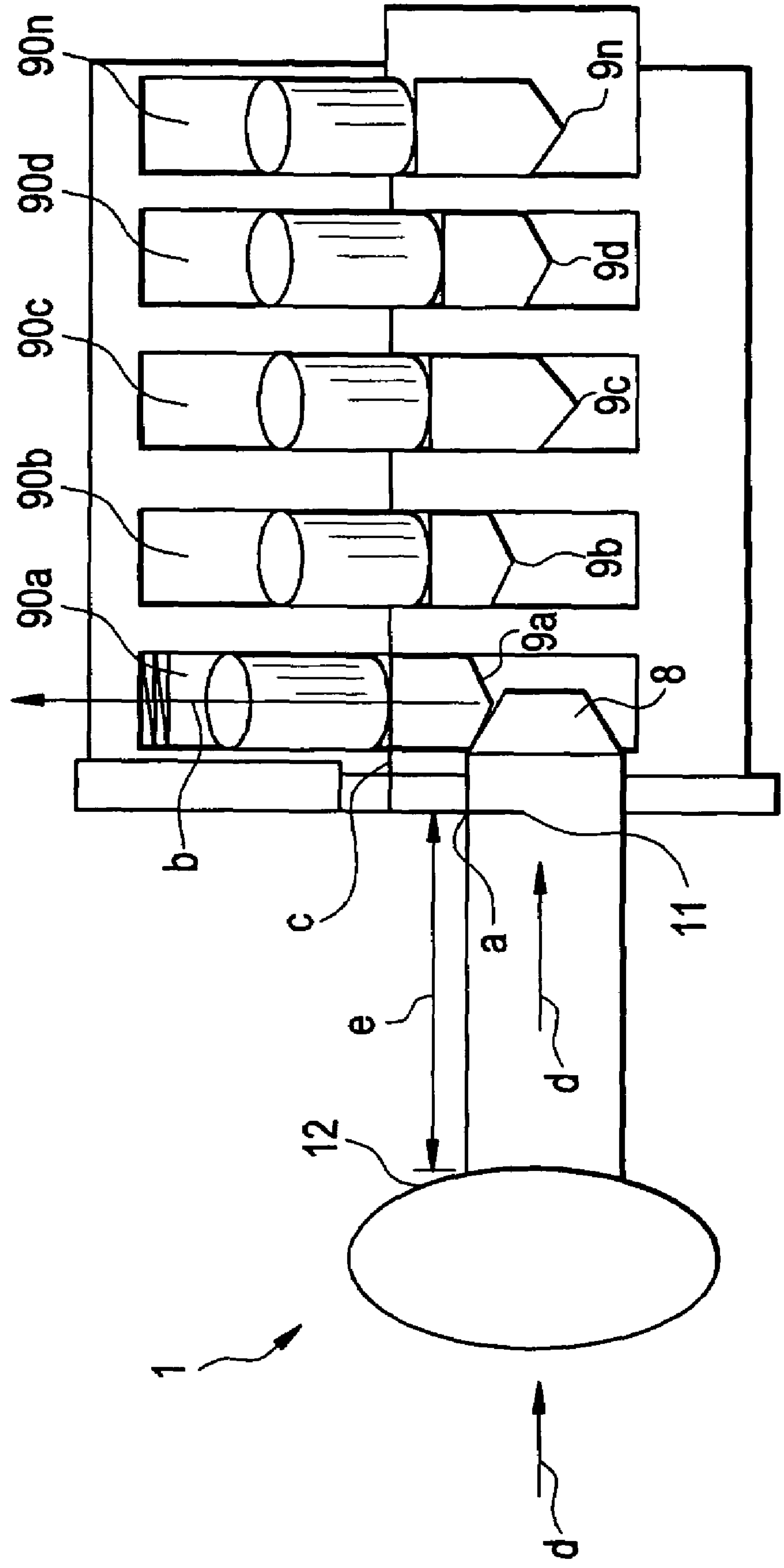
FIG. 3 depicts additional steps in a method for decoding a lock according to embodiments of the present invention.

This stop position occurs when the tip 8 of the blank 1 makes contact with the first "bottom" pin 9*a*; thereby causing the pin 9*a* to move in the direction "b" indicated in FIG. 2 (e.g., upwards). As the pin 9*a* moves in direction b it reaches a shear line position "c" of the lock 7. Thus, the stiff resistance may be said to occur when a pin reaches the shear line position in the lock. In more detail, the shear line position c may be defined as the position where all pins 9*a*-9*e* (disc tumblers, etc . . . ) are aligned such that a plug or chamber 10 may be turned or opened. When the pin 9*a* reaches the shear line c the blank 1 momentarily stops its travel in direction "d" (e.g., inward) through the lock 7. Referring now to FIG. 3, once this stop position is reached a first scribe marking 11 is placed on the key blank 1 to identify the corresponding point on the blank 1 at which the stop occurred. The scribe marking 11 represents the current position for the first cut to be made on an uncut key (not shown in FIG. 3). What remains is to determine how deep a cut is to be made at this point.

In accordance with one embodiment of the invention, to determine the depth of a certain cut, a measurement “e” may be made, for example, from a position on the shoulder 12 of the blank (or any other reference point on the blank) to the scribe marking 11. This measurement may then be compared with pre-determined depth values (i.e., depths) on a decoding template (see FIG. 4) associated with the reference indicators 2*a*-2*n* that are closest to measurement e, to determine an approximate, current depth of the first cut that is associated with the first scribe marking. After creating a scribe marking a user may approximate the depth at which a cut located at this marking may be made by: first, identifying the closest reference indicator 2*a*-2*n* nearest to the marking on the blank; second, referring to a decoding card or template 40 to compare the scribe markings with markings on the template 40 to determine the depth associated with the reference indicator (see FIG. 4) to arrive at the approximate, current depth at which a cut may be made.

After the first cut is determined, the blank 1 may once again be inserted into the lock 7 until the next stop position corresponding to the next pin, in this case pin 9*b*, is detected. When this next stop is detected a next scribe marking is made on the blank 1. This next scribe and the template shown in FIG. 4 may again be used to make the next cut as described above. This process of inserting the blank 1, reaching a stop position, making a next scribe marking and referencing markings on a template may be repeated for each of the bottom pins 9*a*-9*n* (where “n” indicates the last pin). After all of the cuts are determined, a locksmith or other user of the invention may then refer to the approximated, current depths and scribe markings to make cuts into an uncut key using known tools, machinery and standard depth and spacing charts (published by locksmith supply vendors). Although some amount of side pressure or torque is used as the key blank is pushed into a keyway of a lock in order to raise the bottom pins the amount is far less than is required by impressioning. In fact, instead of creating a scribe marking by using a rigorous torquing action as is done in impressioning, the present invention only uses a minimal amount of torquing action; enough to initially raise a bottom pin to the sheer line. Thereafter, a physical scribe marking is made by the user with a pen or the like instead of by continuing to torque the blank in the lock as is done in impressioning.

Up until now we have assumed that a decoding template is readily available to use in determining cutting depths. However, the creation of a unique decoding template for each particular lock is also part of the present invention. That is, not only has the present inventor discovered a faster way to open or decode a lock, he has also discovered a way to create a unique decoding template for each lock so that the lock can be decoded and opened.

Figure 4:
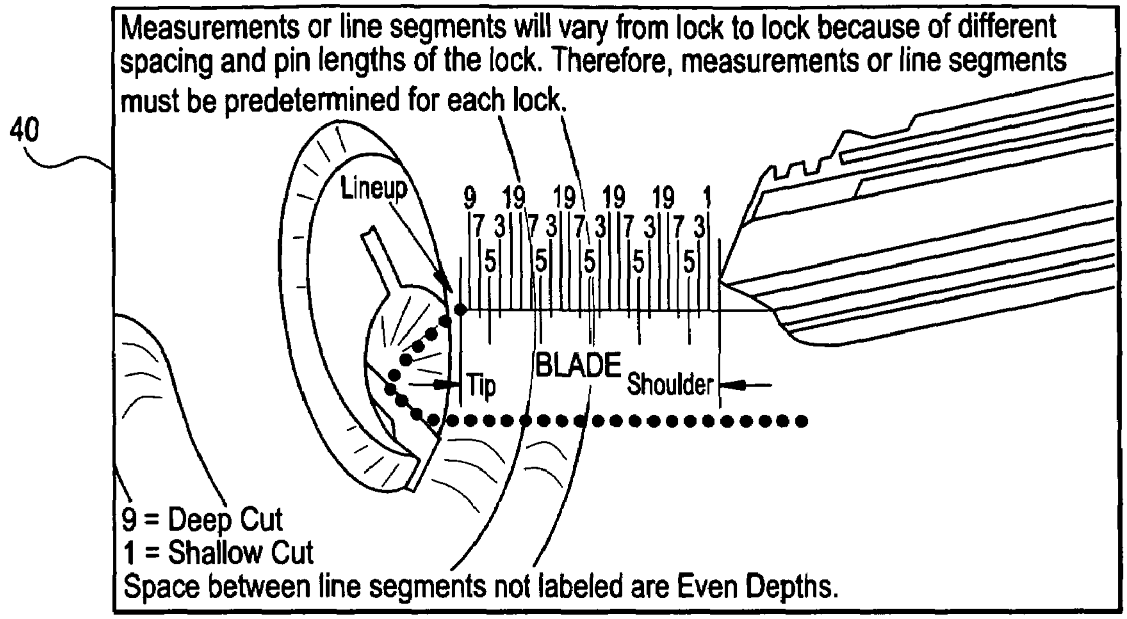
FIG. 4 depicts an example of a decoding card or template showing known depths or cuts that may be compared with scribe markings made on a key blank or the like to reveal the cutting depths or cuts for a key.

In accordance with another embodiment of the invention, prior to opening any particular lock a unique decoding template for the lock is created. One example of such a decoding template 40 is shown in FIG. 4.

Figure 5:
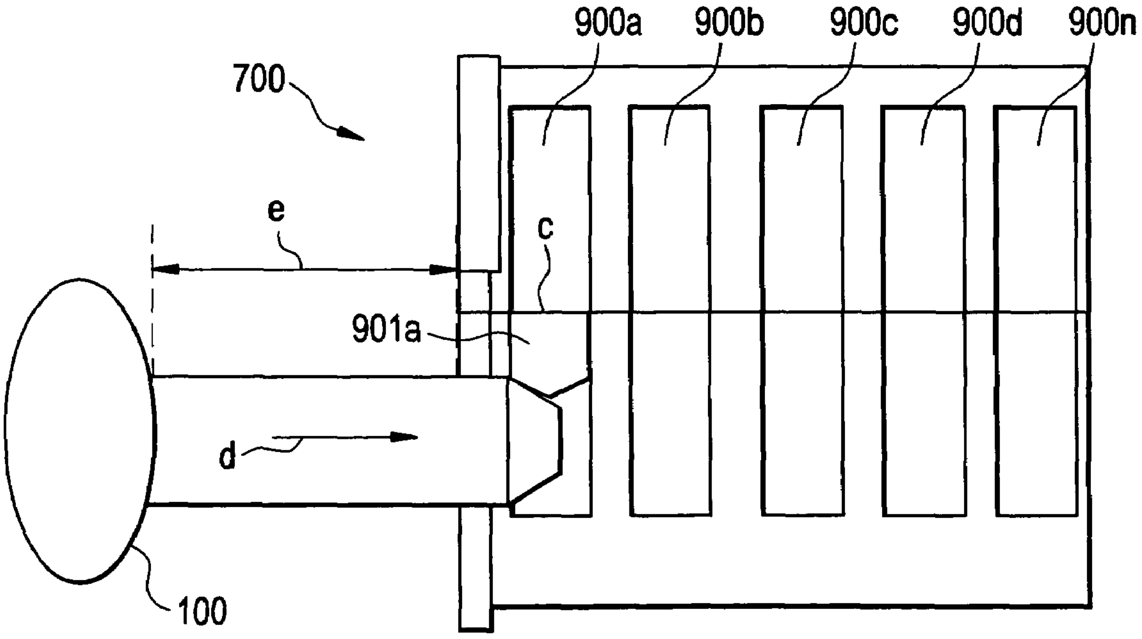

The inventor now presents a description of how such a decoding template may be created. As is known in the art, manufacturers of a given lock, like lock 700 in FIG. 5, may publish a reference sheet (see FIG. 6) that acts as a cross reference or index for translating the length of a reference pin to a cutting depth for a certain lock design/model. Generally depth values of 0 to 9 are assigned to a reference pin. In more detail, first reference pin 901*a* having a known depth value of 9 may be placed within chamber 900*a* of lock 700 (FIG. 5). After the pin 901*a* is installed, (a) a blank 100 may then be inserted, (b) a scribe marking may then be made at a position on the blank corresponding to a point where the blank forces the reference pin 901*a* to the shearline position c and (c) a measurement e may be made. It may be said that this measurement e corresponds with a known depth value of 9.

After a depth value for the first chamber 900*a* is computed, Reference pin 901*a* (having a depth value of 9) may be placed in the next chamber of the lock, 900*b*. Then, the next scribe marking and measurement e may be made as described above. This measurement may be said to correspond to a known depth value of 9 for the second chamber 900*b* of the lock 700. The process just explained is repeated for each chamber 900*a*-900*n* of the lock 700. After the scribe markings and depth values are computed these markings and depth values are used to create markings on a decoding template that correspond to the computed depth values. The template can then be used with a blank 1 as described in the beginning of our discussion to decode and/or open a lock.

If desired, in a further embodiment of the invention, the process just described may be repeated by separately placing one or more additional reference pins, each having a known depth value between 0-8, into each separate pin chamber 900*a*-900*n*, separately making the scribe markings and measurements discussed above and then creating a template. Such a template would contain many markings relatively close together. These markings may be hard to read. Realizing this, the inventor discovered a way to read these closely spaced markings using a magnifying glass or the like. It should be noted that, in yet another embodiment of the invention, the template 40 may itself be made as a magnifying glass. That is, instead of placing the markings on a flat template surface, the markings derived from the reference pins may be placed directly on to a magnifying glass.

In accordance with yet another embodiment of the present invention such a template or card 40 may have reference points located on the card for alignment purposes. This permits fixed reference points to be established on the shoulder or tip of blank 1. Once a template, like template 40, has been aligned on a point along blank 1 (e.g., shoulder or tip) thereby setting reference points, a value associated with each measured distance e associated with each scribe marking can be made using the known distances associated with marks on the template.

The inventor believes that the methods and devices described herein simplify the process of unlocking a lock in at least the following ways. First, a locksmith does not need a priori knowledge of the combination of the lock (pin lengths/depths) nor has to spend time determining the combination of the lock via traditional techniques when a given lock must be opened. Instead, the reference indicators associated with the deepest depths (or all depths) for each pin chamber of any given lock are already placed on a key blank. Second, the use of a decoding card or template simplifies the measurement process because a locksmith (or other user) may quickly compare the scribe markings on a blank with those on a decoding card or template to extrapolate each scribe marking into a depth that must be cut into an actual key. Third, no disassembly of the lock is needed as in the case of “picking”. Fourth, once a lock has been decoded using the methods and devices of the present invention this decoded information (e.g., pin chamber depths) may be used over and over again to create additional keys as opposed to other techniques, such as picking a lock, which do not reveal any depth information.

The inventor believes that the process of inserting a blank or similar device (collectively, still referred to as a “blank”) into a keyway of a pin tumbler, disc tumbler, wafer type of lock to determine cut positions and depths (i.e., together sometimes referred to as a lock’s “combination”) described above is novel. The invention has been described by referring to examples. It should be understood that variations to the examples above may be made without departing from the scope of the invention.

I claim:

1. A method for decoding a lock comprising the steps of:
(a) inserting a one piece device that conforms to a profile of a keyway of the lock into the keyway until a stopping resistance occurs when a pin of the lock reaches a shear line position;
(b) making a marking on the device that corresponds to a point at which the resistance occurred as the device is inserted, the marking further representing a position where a cut may be made on an uncut key;
(c) making a measurement from the marking to one of a plurality of reference indicators on the device; and
(d) comparing the measurement with pre-determined depth values to determine a current depth for the cut associated with the marking,
the one piece device comprising a modifiable surface including the plurality of reference indicators, each indicator indicating spacing of a pin within the lock, and a space between indicators further indicates a range of depth values of each pin within the lock.

2. The method as in claim 1 further comprising the steps of:
(e) repeating steps (a) through (d) for each pin of the lock; and
(f) making cuts into an uncut key using the determined markings and associated depths.

3. The method as in claim 1 wherein the lock is selected from the group consisting of pin tumbler, disc tumbler or wafer type of lock.

4. The method as in claim 1 wherein the device is a key blank.

5. The method as in claim 1 further comprising:
creating a decoding template, the method yet further comprising:
(a) placing a first reference pin having a first known depth value within a first chamber of the lock;
(b) inserting a blank into the lock;
(c) making a scribe marking at a position on the blank corresponding to a point where the blank forces the first reference pin to a shearline,
(d) making a measurement from the scribe marking to a reference position on the blank; and
(e) using the measurements to create a template that has a marking that corresponds to the measurement.

6. The method as in claim 5, further comprising:
repeating steps (a) through (e) for each, next chamber of the lock.

7. The method as in claim 5 further comprising:
placing one or more additional reference pins, each pin having a known depth value of 0 to 8, into each pin chamber; and
repeating steps (b) through (e) for each pin placement.

8. A device comprising:
a one piece device that conforms to a profile of a keyway of a lock, the device further comprising a modifiable surface including a plurality of reference indicators, each indicator indicating spacing of a pin within a lock, wherein a space between indicators further indicates a range of depths of each pin within the lock, and
wherein the lock is selected from the group consisting of pin tumbler, disc tumbler or wafer type of lock.

9. The device as in claim 8 wherein the device is a key blank.

10. The device as in claim 8 further comprising a decoding template comprising one or more markings that correspond to depth values, the markings also corresponding to measurements made by at least separately placing one or more reference pins into one or more chambers of a lock, separately inserting a blank-like device into the lock until the blank forces each of the separately placed reference pins to a shearline position.

11. The template as in claim 10 wherein each of the one or more reference pins has a depth value of 0 to 9.

12. The template as in claim 10 wherein the template is a card.

13. The template as in claim 10 wherein the template is a magnifying glass.

* * * * *